Oct. 19, 1926.

C. L. ERICSON 1,603,755

SAW AND METHOD OF MAKING THE SAME

Filed July 3, 1925

INVENTOR.
Carl L. Ericson,
BY
Frank A. Cutter,
ATTORNEY.

Patented Oct. 19, 1926.

1,603,755

UNITED STATES PATENT OFFICE.

CARL L. ERICSON, OF LONGMEADOW, MASSACHUSETTS, ASSIGNOR TO AMERICAN SAW AND MANUFACTURING COMPANY, OF SPRINGFIELD, MASSACHUSETTS, A CORPORATION OF MASSACHUSETTS.

SAW AND METHOD OF MAKING THE SAME.

Application filed July 3, 1925. Serial No. 41,346.

My invention relates to improvements in saws and methods of making the same, and more particularly to band-saws, hack-saws, and other metal-cutting saws, and methods of producing the same, and consisting essentially of a saw from the sides or points of the teeth of which portions of the metal is removed, by grinding or cutting, the grinding or cutting of said sides or points of said teeth being performed usually after the teeth have been cut from the saw strip, but before they are set, although such operation might be performed before said strip is cut to form the teeth, all as hereinafter set forth.

Although this invention relates more particularly to cold-rolled steel band-saws and their manufacture, it also pertains to the production of hot-rolled steel hack saws, and to other types of saws as well.

The primary object of my invention is to produce a saw, and more particularly a metal-cutting saw, wherein the teeth are uniform in texture throughout, and consequently less liable to chip, crumble, flake off, or break, wherefore the durability and life of the saw are materially increased, and the efficiency of the same maintained throughout such life.

A piece of stock, from which a saw is made, is rolled down from a cylindrical to a flat shape or form, and during this rolling process the stock is annealed a number of times, with the result that more or less decarbonization is bound to take place. Wherever in the stock such decarbonization occurs said stock is softer and weaker, and when these soft and weak parts are located at or adjacent to the points of the teeth subsequently formed on one longitudinal edge of the flat stock, said teeth are seriously impaired, because such decarbonized parts quickly wear away and render the saw inefficient, if not entirely useless. By grinding or milling off, or, in other words, removing, side portions of the teeth, or side portions of the longitudinal edge of the flat strip in which the teeth are subsequently cut, the aforesaid object is attained.

A further object, but one which is incidental and subordinate to the primary object, is to strengthen the teeth of the saw, the strengthening being due to the fact that the teeth are set farther out and thus equalize the strain thereon.

Other objects and advantages will appear in the course of the following description.

I attain the objects and secure the advantages of my invention, in part, by the means illustrated in the accompanying drawings, in which—

Figure 1:
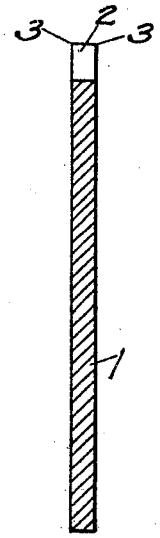
Figure 2:
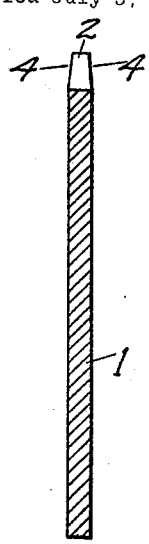
Figure 3:
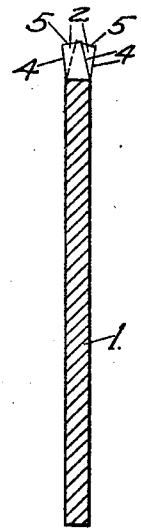
Figure 4:
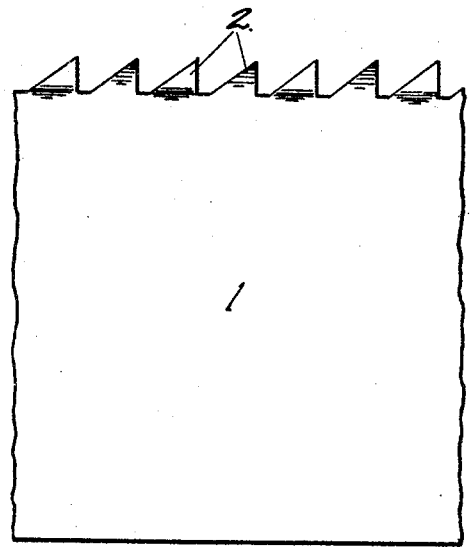

Figure 1 is a cross section through a saw before the teeth are ground or cut for the removal of decarbonized parts, and before they are set; Fig. 2, a similar section taken after the sides of the teeth have been ground or cut; Fig. 3, still another cross section through the saw, but this time taken after the ground or cut teeth have been set, and, Fig. 4; a side elevation of a fragmentary portion of the finished saw.

Similar reference characters designate similar parts throughout the several views.

In the drawings, a saw comprising a flat blade or body and a plurality of teeth 2 is illustrated. The flat strip of steel, of which the saw is made, has exactly parallel sides, and in one longitudinal edge thereof are cut the teeth 2. Obviously, if there be any decarbonized spots or portions at or adjacent to the points 3 of the teeth 2, such portions are weak and liable quickly to wear away when the saw is put into use. To obviate this difficulty or remove this liability, I cut or grind off the opposite sides of the teeth 2, usually and preferably on a taper, as shown at 4—4 Figs. 2 and 3. The sides of the teeth thus cut or ground incline inwardly or toward each other, from the bases of the teeth to their apexes. Although the amount of material thus removed from the teeth is comparatively slight, it is sufficient to take away any decarbonized parts of the teeth that otherwise would be in their cutting area, so that the teeth are left sound throughout.

It is conceivable that the saw strip might initially be cut or ground along both sides of the edge wherein the teeth are subsequently formed, but such procedure would interfere with the accurate cutting of the teeth, and on other accounts be unadvisable, consequently it is preferable to do the side cutting or grinding after the teeth have been cut in the strip.

Furthermore, it is evident that each tooth need not be cut or ground on both sides, inasmuch as it is practically necessary only to cut or grind one tooth on one side, the next tooth on the opposite side, and so on alternately, the cut or ground sides being those which are on the outside after the teeth are set, but ordinarily it would not be feasible from a mechanical standpoint to cut or grind alternating teeth in the manner just explained, hence all of the teeth are cut or ground on both sides. The cutting or grinding on both sides does no harm, and, in fact, has its advantages aside from those incident to production.

After the teeth 2 have been obliquely cut or ground on opposite sides, said teeth are set in the usual manner, as shown on Fig. 3. In order that the teeth, after having had material removed from both sides thereof, shall cut a kerf of the same width as said teeth would have cut it if no material had been removed, the teeth are bent further out in the setting operation, and this necessarily strengthens them. It strengthens the teeth because the cutting edge as 5, of each tooth, after the teeth have been cut or ground, is of less width, or perhaps I should say is shorter, than is such edge before the cutting or grinding operation, hence the cutting strain on each tooth is distributed, reduced, or equalized as between that tooth and the succeeding tooth.

I am aware that saw teeth have by compression been rendered conical perpendicularly to the blade or body of the saw, so that the metal in the teeth is more compact, thinner, or denser, and the teeth consequently are harder than said blade or body, but such process is not believed to be practical, and, in any event, could not be depended upon to remove or eliminate decarbonized surface and near or under surface portions.

What I claim as my invention, and desire to secure by Letters Patent, is—

1. The method of making band- and hack-saws which consists in rolling a piece of stock from cylindrical to flat shape and annealing during the rolling process, in cutting teeth in the strip thus formed, and in cutting away material from such teeth at and adjacent to the cutting parts thereof, where decarbonized portions resulting from the annealing are liable to be found, in order to remove such decarbonized portions and leave said teeth sound.

2. The method of making band- and hack-saws which consists in rolling a piece of stock from cylindrical to flat shape and annealing during the rolling process, in cutting teeth in the strip thus formed, in cutting away portions of said teeth at and adjacent to their points and from opposite sides thereof, where decarbonized portions resulting from the annealing are liable to be found, in order to remove such decarbonized portions and leave said teeth sound, and in setting said teeth.

3. As an improved article of manufacture, a band- or hack-saw made of rolled and annealed stock formed into a strip in which teeth are cut, the cutting portions of said teeth being cut away so that they are narrower at their apexes than at their bases, to free them from surface and near surface decarbonized portions produced by annealing.

CARL L. ERICSON.